United States Patent

[11] 3,618,674

| [72] | Inventors | Robert D. Woodworth<br>Clarendon Hills;<br>Eugen J. Birkenbach, Park Ridge, both of Ill. |
|---|---|---|
| [21] | Appl. No. | 55,639 |
| [22] | Filed | July 17, 1970 |
| [45] | Patented | Nov. 9, 1971 |
| [73] | Assignee | International Harvester Company<br>Chicago, Ill. |

[54] TOOL FOR ADJUSTING DISK HARROW GANGS
5 Claims, 6 Drawing Figs.

[52] U.S. Cl. ............................................. 172/584,
172/591, 172/776, 254/131
[51] Int. Cl. ....................................... A01b 65/02,
A01b 63/26

[50] Field of Search............................................ 172/584,
591, 600, 681, 763, 776; 254/131

[56] References Cited
UNITED STATES PATENTS
| 359,803 | 3/1887 | McIntosh ..................... | 254/131 |
| 2,701,707 | 2/1955 | Miller........................... | 254/131 |

Primary Examiner—Robert E. Pulfrey
Assistant Examiner—C. W. Hanor
Attorney—Floyd B. Harman ABSTRACT: In an agricultural implement such as a disk, harrow, a tool for adjusting the front and rear disk gangs and for securing said disk gangs in the adjusted position.

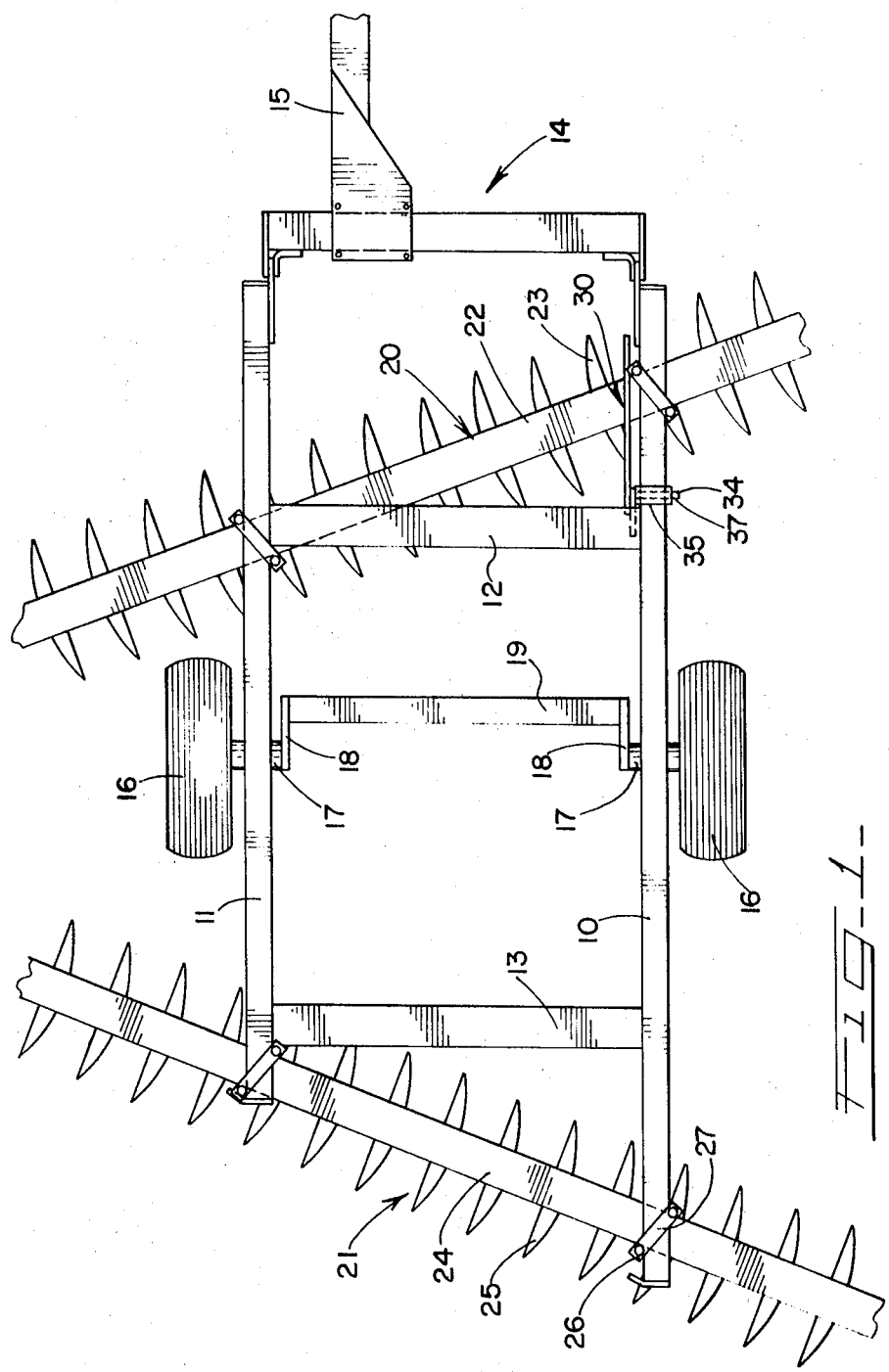

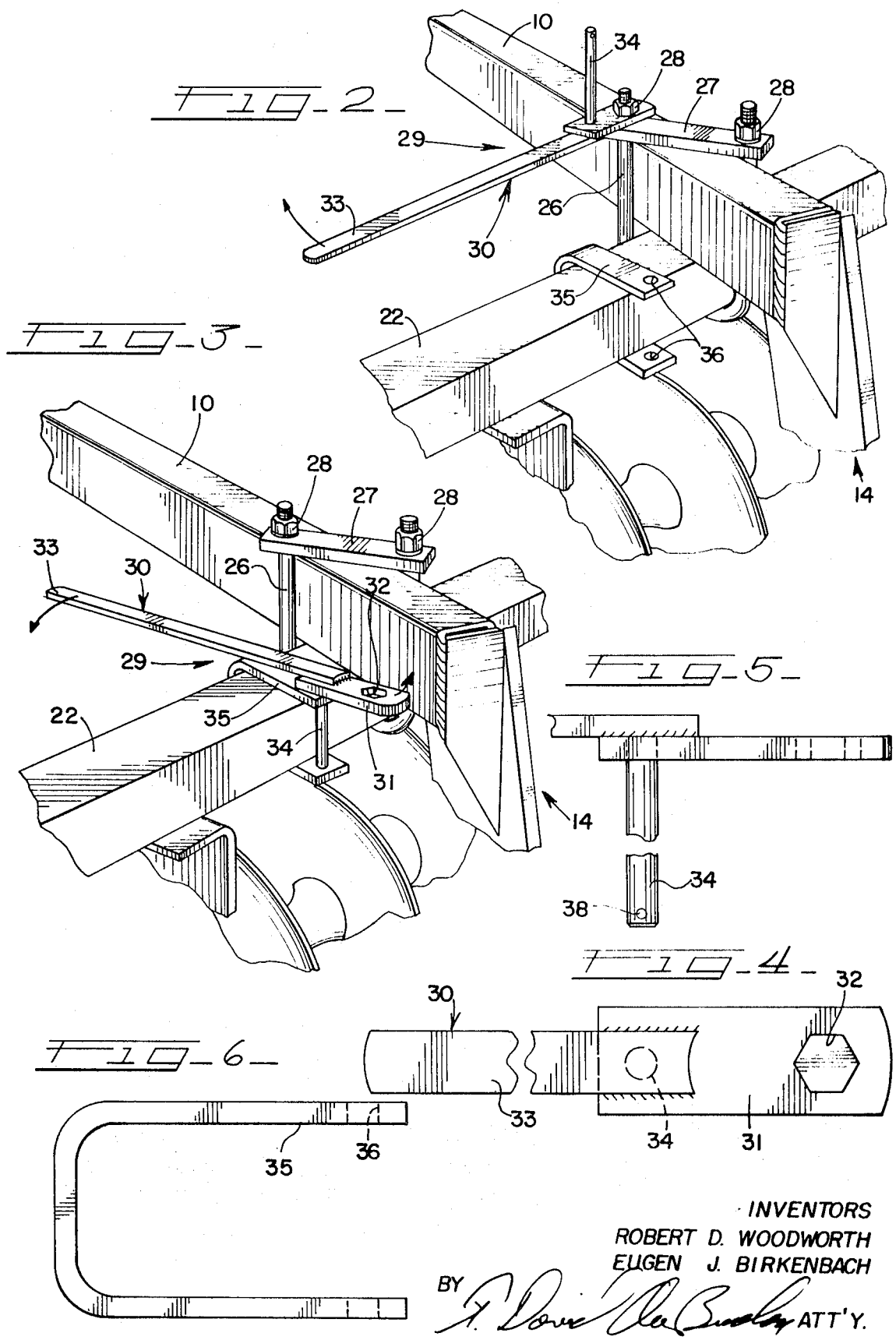

TOOL FOR ADJUSTING DISK HARROW GANGS

BACKGROUND OF THE INVENTION

In the operation of an implement such as an offset disk harrow it is often necessary to adjust the angle between the disk gangs. It is also necessary from time to time in order for the disks of the rear gang to track properly with respect to those of the front gang, to laterally adjust one gang relative to the other.

In the past, the disk gang sections of a disk harrow have been adjusted by first, raising the disk gangs off of the ground and then, loosening whatever means secured the gangs to the frame structure and then the operator would physically move the gangs to the desired adjusted position. The operator was required to carry a certain number of tools or wrenches with him to loosen the disk gang sections from the frame in order to position them. Inevitably, these tools would be lost or misplaced and when the operator got out to the field and prepared to adjust his harrow he would not have the proper tool for the job. Also, the operator was required to exert a great amount of physical energy to move the gangs by sliding them along the frame of the harrow until the desired position was reached.

It is an object of this invention to provide a tool for loosening the disk gangs and for positioning the disk gangs wherein the tool can be used as a lever and the same tool used for tightening the gangs once they are positioned property.

Another object of this invention is to provide a tool for positioning the gangs of a disk harrow which becomes a part of the framework of the disk harrow such that the tool is always available to the operator.

DESCRIPTION OF THE DRAWINGS

FIG. 1 is a plan view of an implement of the type with which the adjusting tool of this invention is associated, showing the tool in its carrying or storage position;

FIG. 2 is an enlarged detail in perspective of a portion of the implement shown in FIG. 1, illustrating the manner in which a portion of the tool of this invention is utilized as a wrench;

FIG. 3 is a view similar to FIG. 2, illustrating the assembled tool in position to adjust one of the gangs;

FIG. 4 is an enlarged plan view of a portion of the tool assembly detached from the implement;

FIG. 5 is a side elevation of a portion of the structure shown in FIG. 4; and

FIG. 6 is a view in side elevation of another part of the tool assembly.

DESCRIPTION OF THE PREFERRED EMBODIMENT

The main frame of an offset disk harrow in generally rectangular in shape and comprises opposed side members 10 and 11 cross braces 12 and 13, and a hitch structure 14 including a drawbar 15, by which the implement is connected to a tractor.

The frame is adapted to ride on a pair of wheels 16 which are mounted on stub axles 17 extending from one end of vertical arms 18. The arms 18 are fixed at their opposite ends to a shaft 19 rotatably journaled at either end in bearings, not shown, secured to the underside of the side frame members 10 and 11. A hydraulic cylinder and cooperating linkage, not shown, is provided to rotate the shaft 19, thus adjusting the height of the frame above the ground. This means for adjusting the height of the frame above the ground is conventional. It permits the operator to control the depth of the tillage gangs while the implement is being used to cultivate the soil, and also permits the gangs to be lifted completely from the ground when the operator desires to adjust the disk gangs to various angled operating positions to provide for the proper filling of the furrows created by the disks.

The front and rear disk gang sections are indicated generally by the numerals 20 and 21, respectively. The front harrow section 20 consists of a supporting frame member 22 upon which is mounted a plurality of disks 23 the concave sides of which are directed to the right of the direction of travel in FIG. 1. The rear disk gang 21 is constructed similarly to the front gang 20 consisting of a rear support member 24 carrying a plurality of disks 25, the concave faces of which are directed to the left of the direction of travel in FIG. 1. The front and rear gangs are generally mounted transversely to the main frame with the outer ends extending beyond the sides of the main frame. Each gang is slidably secured to the side members 10 and 11 of the main frame by means of a large U-bolt 26 and a strap member 27 having openings therein adapted to receive the legs of the U-bolt 26 and secured thereto by nut means 28. This means of attaching the disk gang sections to the main frame is of conventional construction.

The tool means of this invention is generally designated by the numeral 29 and includes a lever member 30 comprising a head portion 31 having a polygonal and preferably hexagonal opening 32 therein adapted to register with the hex head nuts 28 used to secure the support members 22 and 24 to the main frame side rails 10 and 11. A handle portion 33 is secured to said head portion 31 as by welding, and a depending rod 34 located rearwardly of the hexagonal opening 32 in the head portion 31 is secured to the bottom of said head portion 31 as by welding. Member 30 thus constitutes a lever of the first class wherein rod 34 is the fulcrum, head portion 31 a relatively short arm and handle portion a relatively long arm. In order to laterally adjust either the support member 22 or 24, a U-shaped clevis member 35 is slipped over the support member that is to be moved, and the tool member 30 with the depending rod 34 is inserted through a pair of registered openings 36 located near the ends of the U-shaped clevis member 35. As shown in FIG. 3, with the depending rod 34 of tool 30 inserted through the registered openings 36 in clevis 35, the tool is in position to be used as a pry bar in order to exert pressure against the stationary side frame rail 10. The prying action turns the clevis enough to lock it on the support member to be moved and the further prying action pulls the support member 22 laterally with respect to the frame. If more adjustment is desired the clevis is moved toward the frame side rail and the prying operation is repeated. The same procedure is followed for adjusting the rear gang 21 relative to front gang 20, the tool being mounted on rear support member 24 and brought to bear against one of the rails 10 or 11.

The tool member 30 may also be used to aid the operator in angling the front and rear tool gangs with respect to the frame. This is accomplished by installing clevis 35 over frame member 10 and inserting the depending rod 34 through the openings 36 in the clevis 35 and using the tool 30 as a lever, prying against the support member 22 or 24 until the desired angular adjustment is reached. Here again, if more adjustment is needed, the clevis can be moved nearer to the support member and the prying action repeated, the prying action turning the clevis enough to lock it on the side frame member and the further prying action pushing the support member longitudinally with respect to the frame.

The hexagonal-shaped opening 32 in the head portion 31 of tool member 30 is provided so that the tool member can also serve as a wrench in preparing the harrow for adjustment operations by allowing the operator to use the tool member to loosen the nuts 28 used to retain the U-shaped bolts 26 which secured the ends of the harrow sections to the frame.

As best shown in FIG. 1, the tool member 30 is self-storing on the frame of the disk harrow. As illustrated, the tool member 30 is stored, together with the U-shaped clevis 35, along the side of the frame rail 10. The U-shaped clevis is inserted over the frame rail with its legs depending downwardly. The depending rod 34 of the tool bar 30 is then inserted through the openings 36 and the clevis positioned along the frame rail so that the handle portion 33 rests on the forward support member 22. A retainer such as a cotter pin 37 is then inserted through a hole 38 in the end of the depending rod 34 to retain the tool member and the clevis on the frame.

What is claimed is:

1. In a disk harrow having a frame member and a transversely extending disk gang including a supporting member mounted on said frame member, tool means for adjusting the position of said supporting member relative to said frame member comprising, a lever having ahead portion and a handle portion, a fulcrum rod attached to said lever between said head and handle portions, and a U-shaped clevis adapted to fit over one of said members, said clevis having a pair of registered openings near its ends to rotatably receive said fulcrum rod with said head portion engageable with the other of said members, whereby to exert a prying force against said other of said members upon angular movement of said lever about the axis of said fulcrum rod.

2. The invention set forth in claim 1, wherein said one of said members is said disk gang supporting member and the other of said members is said frame member and prying the head of said lever against said frame member pulls said supporting member transversely relative to said frame member.

3. The invention set forth in claim 2, wherein said clevis is optionally disposable on said frame member and the head portions of said lever is engageably with said supporting member to angularly adjust the latter relative to the frame member in response to angular movement of said lever.

6. The invention set forth in claim 1, wherein the mounting of said supporting member on said frame member includes releasable means accommodating said adjustment of said supporting member relative to said frame member.

5. The invention set forth in claim 4, wherein said mounting of said supporting member on said frame member includes a U-bolt and a strap enclosing said members and securing nuts therefor, and wherein a polygonal opening is provided in said lever adapted to mate with said nuts whereby said lever optionally functions as a wrench to loosen said nuts to facilitate adjustment of said supporting member relative to said frame member.

* * * * *